(12) United States Patent
Kataoka et al.

(10) Patent No.: US 7,981,209 B2
(45) Date of Patent: Jul. 19, 2011

(54) INK COMPOSITION

(75) Inventors: Shuichi Kataoka, Matsumoto (JP); Hironori Sato, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 11/885,127

(22) PCT Filed: Feb. 24, 2006

(86) PCT No.: PCT/JP2006/303392
§ 371 (c)(1),
(2), (4) Date: Mar. 19, 2009

(87) PCT Pub. No.: WO2006/090825
PCT Pub. Date: Aug. 31, 2006

(65) Prior Publication Data
US 2009/0176068 A1    Jul. 9, 2009

(30) Foreign Application Priority Data
Feb. 25, 2005   (JP) .................................. 2005-051373

(51) Int. Cl.
*C09D 11/02* (2006.01)
(52) U.S. Cl. .................................. 106/31.59; 106/31.89
(58) Field of Classification Search ............... 106/31.59, 106/31.89
See application file for complete search history.

(56) References Cited

U.S. PATENT DOCUMENTS

| | | | |
|---|---|---|---|
| 5,981,623 A | 11/1999 | McCain et al. | |
| 6,087,416 A * | 7/2000 | Pearlstine et al. | 523/160 |
| 6,613,136 B1 | 9/2003 | Arita et al. | |
| 6,713,531 B2 | 3/2004 | Iijima | |
| 2003/0188665 A1 * | 10/2003 | Sano et al. | 106/499 |
| 2004/0024086 A1 * | 2/2004 | Segawa et al. | 523/160 |

FOREIGN PATENT DOCUMENTS

| | | |
|---|---|---|
| EP | 0 651 037 | 5/1995 |
| EP | 0 882 770 | 9/1998 |
| JP | 10-279871 | 10/1998 |
| JP | 2001-106951 | 4/2001 |
| JP | 2001-106951 A | 4/2001 |
| JP | 2001-254037 A | 9/2001 |
| JP | 2003-192964 | 7/2003 |
| JP | 2003-253166 | 10/2003 |
| JP | 2004-123906 | 4/2004 |
| JP | 2004-131644 | 4/2004 |
| JP | 2005-097597 | 4/2005 |
| WO | 94/26828 | 11/1994 |
| WO | 00/20521 | 4/2000 |

OTHER PUBLICATIONS

Patent Abstracts of Japan of JP 2005-097597 dated Apr. 14, 2005.
Patent Abstracts of Japan of JP 2001-106951 dated Apr. 17, 2001.
Patent Abstracts of Japan of JP 2003-192964 dated Jul. 9, 2003.
Patent Abstracts of Japan of JP 2004-123906 dated Apr. 22, 2004.
Patent Abstracts of Japan of JP 2003-253166 dated Oct. 9, 2003.
Patent Abstracts of Japan of JP 2004-131644 dated Apr. 30, 2004.

* cited by examiner

*Primary Examiner* — Jerry Lorengo
*Assistant Examiner* — Veronica Faison Gee
(74) *Attorney, Agent, or Firm* — Ladas & Parry LLP

(57) ABSTRACT

There is provided an ink composition for ink jet recording that is free from feathering or bleeding and, at the same time, can realize high-gloss images particularly advantageous when the ink composition is recorded on specialty papers. The ink composition comprises at least a colorant, water, and a surfactant, wherein
the surfactant satisfies a requirement represented by formula (I)

$$\beta - \alpha \geq 0 \qquad (I)$$

wherein
(i) $\alpha$ represents contact angle of a recording medium with an aqueous solution containing 0.1% by weight of the surfactant 0.3 sec after the contact of the aqueous solution with the recording medium, degree; and
(ii) $\beta$ represents contact angle of a recording medium with an aqueous solution containing 0.1% by weight of the surfactant, 20% by weight of glycerin, 10% by weight of 1,2-hexanediol and 1.0% by weight of triethanolamine 0.3 sec after the contact of the aqueous solution with the recording medium, degree.

11 Claims, 1 Drawing Sheet

INK COMPOSITION

BACKGROUND OF THE INVENTION

1. Field of Invention

This invention provides an ink composition for ink jet recording, which can realize high-gloss images particularly advantageous when the ink composition is recorded on specialty papers, and an ink jet recording method using the ink composition.

2. Background Art

Ink jet recording is a printing method wherein droplets of an ink are flied and deposited on recording media, such as paper, to perform printing. An innovative advance of a recent ink jet recording technique has made it possible to realize the production of images having quality comparable to images produced by silver salt photography or images yielded by high-definition printing realized only by offset printing. This trend has led to the development of inks for ink jet recording that can realize images having glossy impression comparable to the gloss of images produced by silver salt photography, using, in ink jet recording, the so-called specialty papers, which are recording media having a high level of gloss comparable to photographic paper, art paper and the like used in the field of silver salt photography and offset printing. Further, inks for ink jet recording which can realize image quality comparable to the image quality of images produced by silver salt photography even on plain paper, have also been developed.

Inks, which have been generally used for ink jet recording, are water-based inks that comprise water as a main component and a colorant and various additives. Regarding the colorant, the development of pigment-based inks utilizing the properties of the pigment has recently been forwarded because pigments are superior to dyes in weatherfastness properties such as lightfastness, gasfastness, waterfastness, and moisturefastness.

Regarding the above pigment-based inks, inks, which can realize excellent ejection stability, storage stability, color developing properties, and fixation and, at the same time, can realize substantially bleeding- or feathering-free images, have been demanded. To meet this demand, an ink containing a penetrating agent and a surfactant has been developed. For example, a pamphlet of International Publication No. 94/26828 discloses that bleeding can be reduced by incorporating specific acetylene glycol and polyhydric alcohol lower alkyl ether into ink. Further, Japanese Patent Laid-Open No. 253166/2003 discloses that the addition of a polyorganosiloxane compound having a specific structure can realize excellent ejection stability, storage stability, color development, and fixation and high image quality substantially free from bleeding.

SUMMARY OF THE INVENTION

The present inventors have now found that, for example, in the formation of a high-resolution and high-duty image by superimposing ink dots on top of each other, in some cases, the gloss of images is deteriorated and this unfavorable phenomenon is related to the capability of the ink to wet the recording medium in the deposition of ink droplets on the recording medium. The present inventors have further found that, when an ink having such solution properties that the angle of contact of the ink with the recording medium is a predetermined value is used, an image can be realized which is free from feathering or bleeding and has excellent gloss particularly advantageously when specialty papers are used. The present invention has been made based on such finding.

Accordingly, an object of the present invention is to provide an ink composition that can realize an image which is free from feathering or bleeding and has excellent gloss particularly advantageously when specialty papers are used.

In the ink composition according to the present invention, there is provided an ink composition for ink jet recording, comprising at least a colorant, water, and a surfactant, wherein the surfactant satisfies a requirement represented by formula (I)

$$\beta - \alpha \geqq 0 \quad (I)$$

wherein (i) $\alpha$ represents contact angle of a recording medium with an aqueous solution containing 0.1% by weight of the surfactant 0.3 sec after the contact of the aqueous solution with the recording medium, degree; and (ii) $\beta$ represents contact angle of a recording medium with an aqueous solution containing 0.1% by weight of the surfactant, 20% by weight of glycerin, 10% by weight of 1,2-hexanediol and 0.9% by weight of triethanolamine 0.3 sec after the contact of the aqueous solution with the recording medium, degree.

According to another aspect of the present invention, there is provided an ink jet recording method comprising the steps of ejecting and depositing droplets of an ink composition onto the recording medium to perform printing, wherein the ink composition comprises at least a colorant, water, and a surfactant, and the surfactant satisfies a requirement represented by formula (II)

$$\beta - \alpha \geqq 0 \quad (II)$$

wherein (i) $\alpha$ represents contact angle of a recording medium with an aqueous solution containing 0.1% by weight of the surfactant 0.3 sec after the contact of the aqueous solution with the recording medium, degree; and (ii) $\beta$ represents contact angle of a recording medium with an aqueous solution containing 0.1% by weight of the surfactant, 20% by weight of glycerin, 10% by weight of 1,2-hexanediol and 0.9% by weight of triethanolamine 0.3 sec after the contact of the aqueous solution with the recording medium, degree.

The ink jet recording method using the ink composition according to the present invention can realize an image which is free from feathering or bleeding and has excellent gloss particularly advantageously when specialty papers are used.

DETAILED DESCRIPTION OF THE INVENTION

Ink Composition

Figure 1:
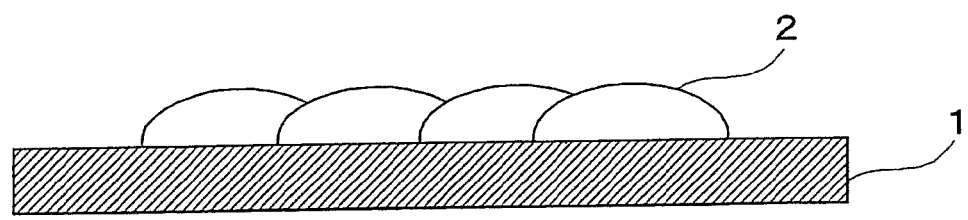
FIG. 1 is a schematic diagram illustrating the deposition of droplets of an ink composition according to the present invention on a recording medium.

The ink composition according to the present invention basically comprises at least a colorant, water and a surfactant.

(1) Surfactant

The surfactant used in the ink composition according to the present invention satisfies a requirement represented by formula (I)

$$\beta - \alpha \geq 0 \quad (I)$$

wherein (i) α represents contact angle of a recording medium with an aqueous solution containing 0.1% by weight of the surfactant (this aqueous solution being hereinafter referred to as "aqueous solution A") 0.3 sec after the contact of the aqueous solution with the recording medium, degree; and (ii) β represents contact angle of a recording medium with an aqueous solution containing 0.1% by weight of the surfactant, 20% by weight of glycerin, 10% by weight of 1,2-hexanediol and 1.0% by weight of triethanolamine (this aqueous solution being hereinafter referred to as "aqueous solution B") 0.3 sec after the contact of the aqueous solution with the recording medium, degree.

According to the ink composition using the above surfactant, for example, even when high-resolution and high-duty images are formed by superimposing ink dots on top of each other, feathering-free or bleeding-free and high-gloss images can be realized. The expression "superimposition of ink dots on top of each other" as used herein refers to the deposition, on a part or the whole of an ink droplet deposited on a recording medium, of a subsequently ejected ink droplet. In the present invention, preferably, ink droplets are deposited on a recording medium so that not less than 10% of the total dot area is accounted for by the superimposed area of the dots. In the present invention, images having highly glossy impression can be realized even in the case of high-resolution images having such superimposed dot parts.

Regarding conditions for ejection of ink droplets in such a manner that ink dots are superimposed on top of each other, a resolution of about 1440 dpi at a duty of not less than 40% is preferred. In order to realize this resolution, the amount of one ink droplet is preferably about 2.0 to 16.0 picomilliliters.

The time interval between the ejection of an ink droplet and the ejection of a subsequent ink droplet is preferably short. That is, high-speed printing is preferred. The term "high-speed" as used herein refers to the head/carriage speed and sheet feed speed in the output of a sheet of size A4 at a speed of not more than about 2 min with a resolution of 1440 dpi×1440 dpi or more.

In the ejection of ink droplets at a high speed as described above, before the absorption of a previously deposited ink droplet into a recording medium, a subsequent ink droplet is deposited, although this phenomenon varies depending upon the resolution of an image to be recorded. Accordingly, in parts where dots are superimposed on top of each other, ink droplets become attached to and unified with each other and, in this state, are absorbed in the recording medium. As a result, the image formed part where the dots have been superimposed on top of each other is smooth, and, thus, recorded images having excellent gloss can be realized.

The contact angle may be measured with a commercially available contact angle goniometer, for example, CA-V contact angle goniometer (manufactured by Kyowa Interface Science Co., Ltd.).

The reason why feathering-free or bleeding-free and high-gloss images can be realized by using the above ink composition has not been fully elucidated yet but is believed to be as follows.

Figure 2:
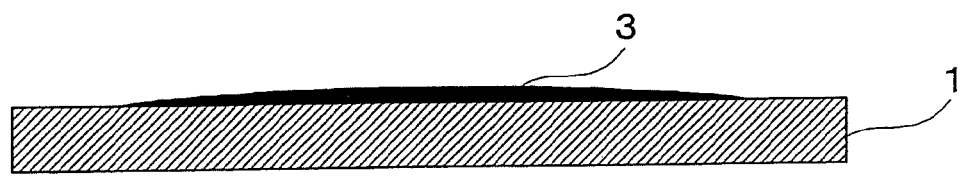
FIG. 2 is a schematic diagram illustrating the deposition of droplets of an ink composition according to the present invention on a recording medium.

In the ink composition according to the present invention, when the surfactant contained in the ink has the above property, the speed of absorption of the solvent into the recording medium upon the deposition of ink droplets on the recording medium is suppressed although the ink per se has a high level of wettability. Accordingly, as shown in FIG. 1, when an ink droplet 2 is deposited onto a recording medium 1 followed by the ejection of a subsequent ink droplet, the subsequent ink droplet is deposited before the absorption of the previously deposited ink droplet into the recording medium. Accordingly, the ink droplets become attached to each other at parts where the dots have been superimposed on top of each other. Thereafter, as shown in FIG. 2, in such a state 3 that the ink droplets have become attached to and unified with each other, the ink is absorbed into the recording medium, and, consequently, the image formed part (dot formed part) can be rendered smooth. It is considered that, by virtue of this, recorded images having excellent gloss can be realized.

Figure 3:
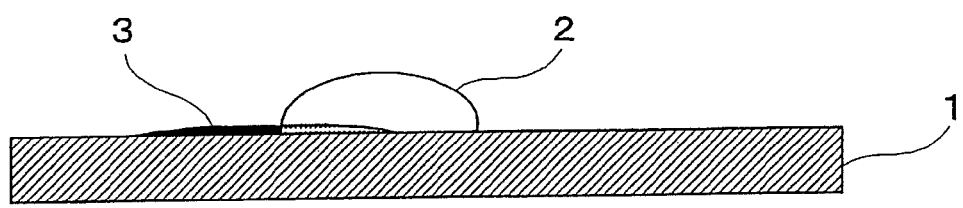
FIG. 3 is a schematic diagram illustrating the deposition of droplets of a conventional ink composition on a recording medium.
Figure 4:
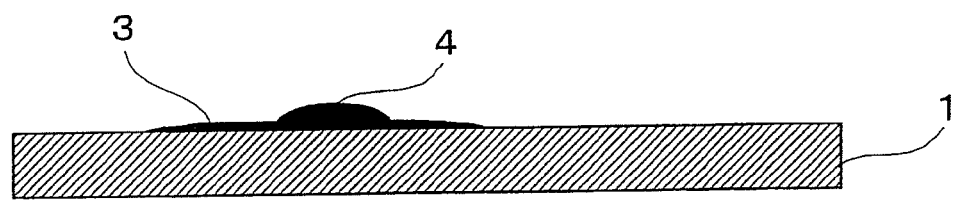
FIG. 4 is a schematic diagram illustrating the deposition of droplets of a conventional ink composition on a recording medium.

On the other hand, unlike the present invention, when the contact angle is not taken into consideration, as shown in FIG. 3, upon the deposition of an ink droplet onto a recording medium 1, an ink 3 is immediately absorbed into the recording medium. When an ink droplet 2 is ejected onto the recording medium 1 so that dots are superimposed on top of each other, since the previously deposited ink droplet 3 has been absorbed into the recording medium, as shown in FIG. 4, the ink droplet 2 is deposited and superimposed on top of the absorbed part (a part where the colorant has been deposited on the recording medium). The dot superimposed part 4 is protuberant as compared with the dot nonsuperimposed part, so that a concave-convex part is formed in the image forming part. Accordingly, when a high-resolution and high-duty image is formed so that dots are superimposed on top of each other, in some cases, the glossy impression is unsatisfactory due to the surface concave-convex part.

In the ink composition deposited on the recording medium, the solvent ingredient, mainly the penetrating agent, contained in the ink is absorbed into the receptive layer in the recording medium in preference to the other ingredients. Accordingly, with the elapse of time, such a state that a water ingredient excess state (that is, such a state that the composition is that of aqueous solution A), takes place on the surface of the recording medium. When the contact angle of aqueous solution A is larger than that of aqueous solution B, the wetting property of the ink (that is, aqueous solution A) after the absorption of the penetrating agent into the recording medium is poor. As a result, as described above, a concave-convex part occurs in the part where the dots have been superimposed on top of each other.

Preferably, the angle of contact of the recording medium with aqueous solution A, that is, α, is not more than 20 degrees, and the angle of contact of the recording medium with aqueous solution B, that is, β, is not less than 20 degrees. When the contact angle is in the above-defined range, an image having better gloss can be realized.

More preferably, the angle of contact of the recording medium with aqueous solution A 10 sec after the contact of the aqueous solution A with the recording medium is not less than 9 degrees, and the angle of contact of the recording medium with aqueous solution B 10 sec after the contact of the aqueous solution B with the recording medium is not less than 7 degrees. The use of a surfactant of which the contact angle 10 sec after the contact with the recording medium is in the above-defined range, can realize an image having excellent gloss and an improved feathering or bleeding property can be effectively realized.

Preferably, the contact angle of each of the aqueous solutions on a recording medium having a surface coated with a polyvinyl alcohol resin or a recording medium provided with a receptive layer is preferably in the above-defined range.

When a surfactant having the above-defined contact angle, for example, on a recording medium coated with a polyvinyl alcohol resin or a recording medium provided with a receptive layer, that is, the so-called "gloss paper," is used, images having excellent gloss can also be realized on recording media such as photographic papers to which glossy impression is more attached.

Any surfactant commonly used in inks for ink jet recording can be used without particular limitation so far as the surfactant has the above properties. Among them, polyorganosiloxanes are preferred, and polysiloxane compounds represented by formula (I) are suitable:

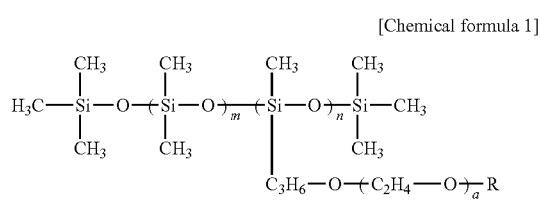

[Chemical formula 1]

wherein R represents a hydrogen atom or a methyl group; a is an integer of 7 to 13; m is an integer of 2 to 70; and n is an integer of 1 to 5. One or at least two compounds represented by the above formula may be contained in the ink composition. The polysiloxane compound represented by formula (I) may be a commercially available product. For example, KF-353A, KF6017, X-22-6551, and AW-3 (all the above products being manufactured by The Shin-Etsu Chemical Co., Ltd.) may be used.

The content of the surfactant in the ink composition according to the present invention is preferably 0.01 to 2.00% by weight, more preferably 0.05 to 0.50% by weight. In particular, when the above surfactant wherein R represents a methyl group is used, the content of the surfactant is preferably higher than the case where the surfactant wherein R represents H is used.

When the compound represented by the above formula is used as the surfactant, preferably, 1,2-hexanediol is contained in the ink composition. When the surfactant is used in combination with 1,2-hexanediol, the solubility of the surfactant in the ink is improved and, consequently, the occurrence of insolubles and the like can be suppressed. Accordingly, an ink composition having better ejection stability can be realized. The content of 1,2-hexanediol is preferably 3 to 30% by weight, more preferably 8 to 18% by weight.

(2) Colorant

Any of dyes and pigments may be used as the colorant. However, pigments are preferred from the viewpoints of lightfastness and waterfastness. Inorganic pigments and organic pigments are usable as the pigment. The inorganic pigments and the organic pigments may be used either solely or as a mixture of two or more. Inorganic pigments usable herein include, for example, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigments (for example, basic dye-type chelate pigments and acid dye-type chelate pigments), nitro pigments, nitroso pigments, and aniline blacks.

Pigments used may be properly selected depending upon the type (color) of the ink composition to be prepared using the pigment dispersion liquid according to the present invention. Examples of pigments for yellow ink compositions include C.I. Pigment Yellow 1, C.I. Pigment Yellow 2, C.I. Pigment Yellow 3, C.I. Pigment Yellow 12, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185. They may be used either solely or in a combination of two or more. The use of one or at least two pigments selected from the group consisting of C.I. Pigment Yellow 74, C.I. Pigment Yellow 110, C.I. Pigment Yellow 128, and C.I. Pigment Yellow 147 is particularly preferred. Examples of pigments for magenta ink compositions include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, and C.I. Pigment Violet 19. They may be used either solely or in a combination of two or more. The use of one or at least two pigments selected from the group consisting of C.I. Pigment Red 122, C.I. Pigment Red 202, C.I. Pigment Red 209, and C.I. Pigment Violet 19 is particularly preferred. Examples of pigments for cyan ink compositions include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, and C.I. Pigment Blue 60; and C.I. Vat Blue 4 and C.I. Vat Blue 60. They may be used either solely or in a combination of two or more. The use of C.I. Pigment Blue 15:3 and/or C.I. Pigment Blue 15:4 is particularly preferred. C.I. Pigment Blue 15:3 is still more preferred. Examples of pigments for black ink compositions include inorganic pigments, for example, carbon blacks (C.I. Pigment Black 7) such as furnace black, lamp black, acetylene black, and channel black and iron oxide pigments; and organic pigments, for example, aniline black (C.I. Pigment Black 1).

In the present invention, preferably, the pigment is one which has been kneaded with a dispersant which will be described later. However, pigments not subjected to surface treatment can also form excellent color images.

The ink composition according to the present invention preferably comprises a copolymer resin of a hydrophobic monomer and a hydrophilic monomer as a dispersant for dispersing the pigment. The copolymer resin is adsorbed to a pigment to improve the dispersibility of the pigment.

Specific examples of hydrophobic monomers include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, and vinyltoluene. They may be used either solely or as a mixture of two or more.

Specific examples of hydrophilic monomers include acrylic acid, methacrylic acid, maleic acid, and itaconic acid.

The copolymer resin of a hydrophobic monomer and a hydrophilic monomer is preferably at least any one of styrene-(meth)acrylic acid copolymer resins, styrene-methylstyrene-(meth)acrylic acid copolymer resins, styrene-maleic acid copolymer resins, (meth)acrylic acid-(meth)acrylic ester copolymer resins, and styrene-(meth)acrylic acid-(meth)acrylic ester copolymer resins, from the viewpoints of simultaneously satisfying color image gloss, bronzing prevention, and ink composition storage stability requirements and, at the same time, forming color images having better gloss.

The copolymer resin may be a resin (styrene-acrylic acid resin) comprising a polymer produced by reacting styrene with acrylic acid or an acrylic ester. Alternatively, the copolymer resin may be an acrylic acid-type water soluble resin. Alternatively, salts thereof, for example, sodium, potassium, or ammonium salts thereof, may also be used.

The content of the copolymer resin is preferably 10 to 50 parts by weight, more preferably 10 to 35 parts by weight, based on 100 parts by weight of the pigment, from the viewpoints of simultaneously satisfying color image gloss, bronzing prevention, and ink composition storage stability requirements and, at the same time, forming color images having better gloss.

Examples of surfactants which are preferred as dispersants include anionic surfactants such as fatty acid salts, higher alkyldicarboxylic acid salts, higher alcohol sulfuric ester salts, higher alkylsulfonic acid salts, condensates of higher fatty acids with amino acids, sulfosuccinic ester salts, naphthenic acid salts, liquid fatty oil sulfuric ester salts, and alkylallylsulfonic acid salts; cationic surfactants such as fatty acid amine salts, quaternary ammonium salts, sulfonium salts, and phosphoniums; and nonionic surfactants such as polyoxyethylene alkyl ethers, polyoxyethylene alkyl esters, sorbitan alkyl esters, and polyoxyethylene sorbitan alkyl esters. It is needless to say that the above surfactants, when added to the ink composition, can function also as a surfactant. In this case, however, the surfactant should be added so that the contact angle of the recording medium with the ink composition falls within the above defined range.

(3) Other Ingredients

Further, the ink composition according to the present invention preferably comprises a penetrating agent in addition to the above ingredients.

Glycol ethers are suitable as the penetrating agent.

Specific examples of glycol ethers usable herein include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, and 1-methyl-1-methoxybutanol. They may be used either solely or as a mixture of two or more.

Among the above glycol ethers, alkyl ethers of polyhydric alcohols are preferred. Particularly preferred are ethylene glycol monoethyl ether, ethylene glycol mono-n-butyl ether, diethylene glycol monomethyl ether, diethylene glycol monoethyl ether, diethylene glycol mono-n-butyl ether, triethylene glycol monomethyl ether, triethylene glycol monoethyl ether, or triethylene glycol mono-n-butyl ether. More preferred are triethylene glycol mono-n-butyl ether.

The addition amount of the penetrating agent may be properly determined but is preferably about 0.1 to 30% by weight, more preferably about 1 to 20% by weight.

Preferably, the ink composition according to the present invention comprises a wetting agent. Polyhydric alcohols are suitable as the wetting agent. Specific examples of polyhydric alcohols include glycerin, ethylene glycol, diethylene glycol and triethylene glycol.

The addition amount of the wetting agent may be properly determined but is preferably 0.1 to 30% by weight, more preferably about 1 to 20% by weight. It would be apparent to a person having ordinary skill in the art that a part of the penetration solvent functions also as a wetting agent.

If necessary, other additives, for example, nozzle clogging preventives, preservatives, antioxidants, electric conductivity adjustors, pH adjustors, viscosity modifiers, surface tension modifiers, and oxygen absorbers, may be added to the ink composition according to the present invention.

For example, sodium benzoate, pentachlorophenol sodium, 2-pyridinethiol-1-oxide sodium, sodium sorbate, sodium dehydroacetate, and 1,2-dibenzothiazolin-3-one (Proxel CRL, Proxel BND, Proxel GXL, Proxel XL-2, and Proxel TN, manufactured by ICI) may be used as preservatives and antimolds.

Examples of pH adjustors, solubilizers, or antioxidants usable herein include: amines such as diethanolamine, triethanolamine, propanolamine, and morpholine, and modification products thereof; inorganic salts such as potassium hydroxide, sodium hydroxide, and lithium hydroxide; ammonium hydroxide; quaternary ammonium hydroxides such as tetramethylammonium; salts of carbonic acid such as potassium carbonate, sodium carbonate, and lithium carbonate; salts of phosphoric acid, such as potassium phosphate, sodium phosphate, and lithium phosphate; N-methyl-2-pyrrolidone; urea compounds such as urea, thiourea, and tetramethylurea; allophanates such as allophanate and methyl allophanate; biurets such as biuret, dimethylbiuret, and tetramethylbiuret; and L-ascorbic acid and salts thereof.

The ink composition according to the present invention may contain an additional antioxidant and an ultraviolet absorber, and examples thereof include: Tinuvin 328, Tinuvin 900, Tinuvin 1130, Tinuvin 384, Tinuvin 292, Tinuvin 123, Tinuvin 144, Tinuvin 622, Tinuvin 770 and Tinuvin 292 manufactured by Ciba Specialty Chemicals, K.K.; Irgacor 252 and Irgacor 153; Irganox 1010, Irganox 1076, and Irganox 1035; MD 1024; and lanthanide oxides.

The ink composition according to the present invention can be produced by dispersing and mixing the above ingredients by a suitable method. Preferably, an ink solution is prepared by first mixing the pigment, the polymeric dispersant, and water together by a suitable dispergator, for example, a ball mill, a sand mill, an attritor, a roll mill, an agitator mill, a Henschel mixer, a colloid mill, an ultrasonic homogenizer, a jet mill, or an angmill to prepare a homogeneous pigment dispersion liquid, then adding, for example, separately prepared resins (resin emulsion), water, water soluble organic solvents, saccharides, pH adjustors, preservatives and antimolds, and satisfactorily dissolving the components. After the satisfactory stirring, the mixture is filtered for the removal of coarse particles and foreign matter causative of clogging to prepare a contemplated ink composition.

Method for Ink Jet Recording

The method for ink jet recording according to the present invention comprises ejecting droplets of the ink composition and depositing the droplets onto a recording medium to perform printing. In this method, the ejected ink droplets are deposited onto the recording medium so that dots are superimposed on top of each other. In the method according to the present invention, feathering- or bleeding-free and high-gloss images can be realized even in the formation of high-resolution images by superimposing ink dots on top of each other. The recording medium is preferably the so-called photographic paper-based gloss paper formed of paper coated with a polyvinyl alcohol resin. The use of photographic paper-based gloss paper can realize images having excellent glossy impression.

EXAMPLES

The present invention is further illustrated by the following Examples that are not intended as a limitation of the invention.

(1) Preparation of Surfactant

Polyorganosiloxanes having respective compositions shown in Table 1 below were used as surfactants used in ink compositions.

TABLE 1

| Surfactant (tradename) | Composition (wt %) | | | | | |
|---|---|---|---|---|---|---|
| | Ex. 1 | Ex. 2 | Ex. 3 | Comp. Ex. 1 | Comp. Ex. 2 | Comp. Ex. 3 |
| KF-353A | 100 | — | — | — | — | — |
| KF6017 | — | 30 | — | — | — | — |
| X-22-6551 | — | — | 10 | — | — | — |
| AW-3 | — | 70 | 90 | — | — | — |
| BYK348 | — | — | — | 100 | — | — |
| BYK347 | — | — | — | — | 100 | — |
| SF465 | — | — | — | — | — | 100 |
| Total | 100 | 100 | 100 | 100 | 100 | 100 |

All of KF-353A, KF6017, X-22-6551, and AW-3 are polyorganosiloxane compounds manufactured by The Shin-Etsu Chemical Co., Ltd., and all of BYK347, BYK348, and SF465 are polyorganosiloxane compounds manufactured by Bik-Chemie Japan K.K.

(2) Evaluation on Properties of Surfactant

Properties of solutions of six surfactants used in Examples 1 to 3 and Comparative Examples 1 to 3 were evaluated as follows.

Aqueous solution A containing 0.1% by weight of a surfactant for Example 1, and aqueous solution B containing 0.1% by weight of a surfactant for Example 1, 20% by weight of glycerin, 10% by weight of 1,2-hexanediol, and 0.9% by weight of triethanolamine were prepared. For each of surfactants for Examples 2 and 3 and Comparative Examples 1 to 3, two aqueous solutions were prepared in the same manner as described above.

Aqueous solutions A and B thus prepared were visually inspected for appearance and was then inspected for the presence of insolubles in the solution, and the solubility of the surfactants was evaluated according to the following criteria.

◯: The aqueous solution was colorless and transparent.
◯-Δ: The aqueous solution was slightly cloudy.
Δ: The aqueous solution was cloudy.
x: Insoluble precipitates were present in a part of the aqueous solution.

The results were as shown in Table 2 below.

Next, for aqueous solutions A and B, the contact angle 0.3 sec after contact with a recording medium and the contact angle 10 sec after the contact with a recording medium were measured with a contact angle goniometer (CA-V; manufactured by Kyowa Interface Science Co., Ltd.). Conditions for the measurement were as follows.

Measuring temperature: 23° C.
Recording medium: Photographic paper (gloss) (manufactured by Seiko Epson Corporation)

The results are shown in Table 2.

TABLE 2

| | | | Surfactant | | | | | |
|---|---|---|---|---|---|---|---|---|
| | | | Ex. 1 | Ex. 2 | Ex.3 | Comp. Ex. 1 | Comp. Ex. 2 | Comp. Ex. 3 |
| Aqueous solution A | Solubility | | Δ | ◯ | ◯ | ◯ | Δ | ◯ |
| | Contact angle α (degrees) | After 0.3 sec | 18.6 | 18.5 | 17.7 | 18.0 | 17.6 | 15.4 |
| | | After 10 sec | 13.8 | 14.5 | 11.7 | 7.6 | 7.2 | 7.6 |
| Aqueous solution B | Solubility | | ◯ | ◯ | ◯ | ◯ | ◯ | ◯ |
| | Contact angle β (degrees) | After 0.3 sec | 22.0 | 22.4 | 21.4 | 14.4 | 14.2 | 13.8 |
| | | After 10 sec | 10.3 | 10.8 | 11.1 | 4.5 | 2.8 | 4.1 |
| Contact angle difference (after 0.3 sec) β − α (degrees) | | | 3.4 | 3.9 | 3.7 | −3.6 | −3.4 | −1.6 |

(3) Preparation of Ink Composition

Ink 1Y was prepared by mixing the following individual ingredients together and filtering the mixture through a 10-μm membrane filter.

| | |
|---|---|
| Surfactant for Example 1 | 0.1 wt % |
| Pigment dispersant | 30 wt % |
| Glycerin | 20 wt % |
| 1,2-Hexanediol | 10 wt % |
| Triethanolamine | 0.9 wt% |
| Pure water | Balance |

The pigment dispersion liquid used in ink 1Y was prepared as follows.

At the outset, a pigment (C.I. Pigment Yellow 74) and a styrene-acrylic acid copolymer (molecular weight 1600, acid value 150) were mixed together, and the mixture together with glass beads (diameter: 1.7 mm, amount: 1.5 times (by weight) larger than the mixture) was dispersed in a sand mill (manufactured by Yasukawa Seisakusho) for 2 hr. Thereafter, the glass beads were removed, and the surfactant for Example 1, glycerin, 1,2-hexanediol, and triethanolamine were added to the dispersion liquid, and the mixture was stirred at room temperature for 20 min. The mixed solution was filtered through a 10-μm membrane filter to prepare a pigment dispersion liquid. The resultant dispersion liquid had a colorant concentration of 10%. Separately, inks 1M, 1C, and 1K having the same composition as described above were prepared in the same manner as described above, except that the colorant was changed from C.I. Pigment Yellow 74 to C.I. Pigment Violet 19, C.I. Pigment Blue 15:4, and carbon black. Thus, ink set 1 comprising four ink compositions, a yellow ink composition, a magenta ink composition, a cyan ink composition, and a black ink composition, was prepared.

Ink sets 2 to 6 were prepared in the same manner as in ink set 1, except that surfactants for Examples 2 and 3 and Comparative Examples 1 to 3 were used instead of the surfactant used in ink set 1.

(4) Evaluation of Ink Compositions

Each ink set prepared above was loaded into an ink cartridge in an ink jet printer (PX-G900; manufactured by Seiko Epson Corporation), and a tertiary color of duty 60% (each duty 20%) was printed on a photographic paper (size L, manufactured by Seiko Epson Corporation) with a resolution of 1440×1440 dpi. In this case, printing was carried out so that not less than 10% of the total dot area was accounted for by the superimposed dots.

For the recorded matters thus obtained, the intensity of reflected light was measured with an automatic angle changing photometer (model GP-200; manufactured by Murakami Color Research Laboratory) under conditions of incident angle 45 degrees (slit width: incidence side 1 mmφ, reflection side 1.5 mmφ), sensitivity 500, elevation angle 0 (zero degree), and reflection angle 42 to 48 degrees. In this case, a halogen lamp of 12 V-50 W was used as a light source, and ND-10 was used as a filter. Voltage applied to the light source was regulated so that the gloss of a reference plate was 42.5. The gloss of the recorded matter refers to the highest value among the measured intensity values of reflected light measured under the measurement conditions. The reproduction error was ±2.0 or less.

The glossy impression level of the recorded matter was determined by the following equation.

$$\text{Glossy impression level} = (\text{gloss})/(\text{sharpness})^2$$

In the equation, the gloss refers to the gloss obtained by the above measurement, and the sharpness indicates an image sharpness level (also known as "image clarity") of the recorded image and refers to the width of reflection angle which provides a reflected light intensity of not less than 0.6 among reflected light intensities obtained in the gloss measurement. The glossy impression level determined by the above equation is substantially in agreement with the results of visually observed gloss evaluation. The results were evaluated according to the following criteria.

A: The average value of glossy impression level of tertiary color was 5.0 or more.

B: The average value of glossy impression level of tertiary color was not less than 4.0 and less than 5.0.

C: The average value of glossy impression level of tertiary color was not less than 3.0 and less than 4.0

D: The average value of glossy impression level of tertiary color was less than 3.0.

The results of evaluation of the glossy impression level was as shown in Table 3.

TABLE 3

| Ink composition | Gloss |
|---|---|
| Ex. 1 (ink set 1) | A |
| Ex. 2 (ink set 2) | A |
| Ex. 3 (ink set 3) | A |
| Comp. Ex. 1 (ink set 4) | C |
| Comp. Ex. 2 (ink set 5) | C |
| Comp. Ex. 3 (ink set 6) | C |

The invention claimed is:

1. An ink composition for ink jet recording, comprising at least a colorant, water, a surfactant and 1,2-hexanediol, wherein the surfactant satisfies a requirement represented by formula (1)

$$\beta - \alpha \geq 0 \quad (1)$$

wherein (i) α represents contact angle of a recording medium with an aqueous solution containing 0.1% by weight of the surfactant 0.3 sec after the contact of the aqueous solution with the recording medium, degree; and (ii) β represents contact angle of a recording medium with an aqueous solution containing 0.1% by weight of the surfactant, 20% by weight of glycerin, 10% by weight of 1,2-hexanediol and 0.9% by weight of triethanolamine 0.3 sec after the contact of the aqueous solution with the recording medium degree, the α value is not more than 20 degrees, and the β value is not less than 20degrees, the surfactant is polyorganosiloxane and is present in the ink composition in an amount of 0.01 to 2 percent by weight, the 1,2-hexanediol being present in the ink composition in an amount effective to improve solubility of the surfactant in the ink composition, said amount of 1,2-hexanediol being in a range of 8 to 18% by weight, wherein the polyorganosiloxane comprises one or at least two compounds represented by the following formula:

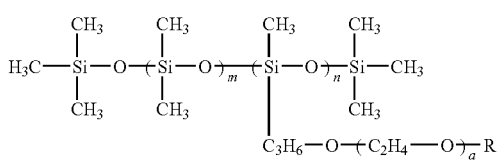

wherein R represents a hydrogen atom or a methyl group; a is an integer of 7 to 13; m is an integer of 2 to 70; and n is an integer of 1 to 5.

2. The ink composition according to claim 1, for use in an ink jet recording method comprising: ejecting and depositing liquid droplets onto a recording medium so that dots are superimposed on top of each other to perform printing.

3. The ink composition according to claim 1, wherein the recording medium has a surface coated with a polyvinyl alcohol resin.

4. The ink composition according to claim 1, wherein the recording medium comprises an ink-receptive layer.

5. The ink composition according to claim 2, wherein not less than 10% of the total dot area is accounted for by superimposed dots.

6. An ink jet recording method comprising the steps of ejecting and depositing droplets of an ink composition onto a recording medium to perform printing, wherein
the ink composition comprises at least a colorant, water, 1,2-hexanediol and a surfactant, and
the surfactant satisfies a requirement represetned by formula (ii)

β−α≧0     (II)

wherein
(i) α represents contact angle of a recording medium with an aqueous solution containing 0.1% by weight of the surfactant 0.3 sec after the contact of the aqueous solution with the recording medium, degree; and
(ii) β represents contact angle of a recording medium with an aqueous solution containing 0.1% by weight of the surfactant, 20% by weight of glycerin, 10% by weight of 1,2-hexanediol and 1.0% by weight of triethanolamine 0.3 sec after the contact of the aqueous solution with the recording medium, degree,
the α value is not more than 20 degrees, and the β value is not less than 20 degrees,
the surfactant is polyorganosiloxane and is present in the ink composition in an amount of 0.01 to 2 percent by weight, the 1,2-hexanediol being present in the ink composition in an amount effective to improve solubility of the surfactant in the ink composition, said amount of 1,2-hexanediol being in a range of 8 to 18% by weight, wherein the polyorganosiloxane comprises one or at least two compounds represented by the following formula:

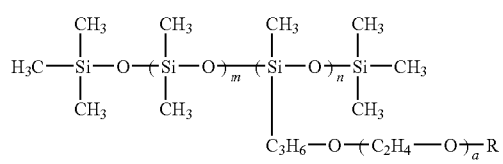

wherein R represents a hydrogen atom or a methyl group; a is an integer of 7 to 13; m is an integer of 2 to 70; and n is an integer of 1 to 5.

7. The method according to claim 6, wherein the ejected ink droplets are deposited on the recording medium so that dots are superimposed on top of each other.

8. The method according to claim 6, wherein the recording medium has a surface coated with a polyvinyl alcohol resin.

9. The method according to claim 6, wherein the recording medium comprises an ink-receptive layer.

10. The method according to claims 7, wherein the ink droplets are deposited on the recording medium so that not less than 10% of the total dot area is accounted for by superimposed dots.

11. A recorded matter recorded by a method for ink jet recording according to claim 6.

* * * * *